(12) United States Patent
Gray et al.

(10) Patent No.: US 6,408,938 B2
(45) Date of Patent: *Jun. 25, 2002

(54) HEAT EXCHANGER

(75) Inventors: Alan Gray, Oxon; Richard Kendall Bolingbroke, Newport; John Michael Evans, Gwent, all of (GB)

(73) Assignee: Alcan International Limited, Montreal (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/051,735

(22) PCT Filed: Nov. 19, 1996

(86) PCT No.: PCT/GB96/02843

§ 371 (c)(1),
(2), (4) Date: Apr. 20, 1998

(87) PCT Pub. No.: WO97/18946

PCT Pub. Date: May 29, 1997

(30) Foreign Application Priority Data

Nov. 21, 1995 (GB) ............................................. 9523795

(51) Int. Cl.[7] ........................... F28F 13/18; F28F 19/02; B21D 53/02; B23P 15/26; C22C 21/04
(52) U.S. Cl. ...................... 165/133; 165/905; 420/537; 420/538; 420/548; 420/549; 420/550; 420/553; 29/890.03; 29/890.031; 29/890.046; 29/890.053
(58) Field of Search .............................. 165/905, 133, 165/134.1, 182; 420/537–538, 548, 549, 550, 551, 553, 528; 428/650, 654; 29/890.03, 890.031, 890.046, 890.053

(56) References Cited

U.S. PATENT DOCUMENTS

| | | | |
|---|---|---|---|
| 4,235,628 A | 11/1980 | Althoff et al. ................ 75/148 |
| 4,991,647 A | * 2/1991 | Kawabe et al. ........... 165/134.1 |
| 5,176,205 A | 1/1993 | Anthony ...................... 165/133 |
| 5,345,674 A | * 9/1994 | Knecht et al. ......... 29/890.044 |
| 5,460,895 A | * 10/1995 | Rungta et al. ............... 428/654 |
| 5,744,255 A | * 4/1998 | Doko et al. .................. 428/654 |
| 5,837,388 A | * 11/1998 | Doko et al. .................. 428/654 |

FOREIGN PATENT DOCUMENTS

| | | |
|---|---|---|
| AU | 32009 | 7/1969 |
| AU | 40227 | 9/1973 |
| EP | 037132 | 10/1981 |
| FR | 2411244 | 7/1979 |
| GB | 2248069 | 3/1992 |

OTHER PUBLICATIONS

English translation of Japanese Specification Hei 3–134129 (Showa Aluminium K.K., 1991).

Patent Abstracts Of Japan, vol. 17, No. 382 (C–1085) Jul. 19, 1993, corresponding to Japanese Patent Publication No. JP–5065582.

Patent Abstracts Of Japan, vol. 16, No. 544 (C–1004) Nov. 13, 1992, corresponding to Japanese Patent Publication No. JP–4202735.

Patent Abstracts Of Japan, vol. 15, No. 345 (C–0864) Sep. 3, 1991, corresponding to Japanese Patent Publication No. JP–3134129.

* cited by examiner

Primary Examiner—Paul Thibodeau
Assistant Examiner—Holly C. Rickman
(74) Attorney, Agent, or Firm—Cooper & Dunham, LLP

(57) ABSTRACT

An aluminum alloy containing (in wt. %): 0.2–0.5 Fe; 0.7–1.2 Si; 1.2–1.6 Mn; up to 0.3 Mg; up to 0.5 Cu; up to 0.2 Zn; up to 0.1 Ti is used to make the fins of heat exchangers particularly car radiators. The finstock has high post braze strength and thermal conductivity, and has a sufficiently electronegative potential as to be capable of acting as a sacrificial anode for the heat exchanger tubes. By virtue of the absence of Sn, In, and Cr, these heat exchangers can be scrapped and melted for re-use.

8 Claims, No Drawings

HEAT EXCHANGER

Aluminium alloy heat exchangers, provided with header plates, tank units, tubes for coolant (water) and fins for improved heat exchange, are very widely used in the automobile industry and elsewhere. Generally the fins are joined to the tubes by brazing e.g. by the NOCOLOK™ technique or under vacuum. In order to reduce corrosion of the tubes with consequent leakage of coolant, it has been common practice to make the fins electronegative relative to the tubes, so that the fins act as sacrificial anodes. This may be done by adding Zn, Sn, or In to the metal used to form the fins.

After prolonged use, discarded heat exchangers are routinely recovered and re-melted together with process scrap for re-use. But the presence of Zn, Sn or In in tube, header plate or tank units would significantly reduce their corrosion resistance. So the melt can only be used in the production of casting alloy of rather wide composition ranges and correspondingly low value. Similarly Cr is undesirable in Al alloy metal to be melted for re-use. There is a need in the automotive industry to provide heat exchangers that can be recycled back into heat exchanger components. It is one object of this invention to meet that need.

In one aspect the invention provides an alloy having the composition.

| Component | Broad (wt %) | Preferred |
|---|---|---|
| Fe | 0.2–0.5 | 0.3–0.5 |
| Si | 0.7–1.2 | 0.8–1.0 |
| Mn | 1.2–1.6 | 1.25–1.5 |
| Mg | up to 0.3 | 0.07–0.13 |
| Cu | up to 0.5 | 0.27–0.4 |
| Zn | up to 0.2 | up to 0.1 |
| Ti | up to 0.1 | up to 0.05 |
| Others | up to 0.05 each, 0.15 total | |
| Al | Balance | |

Although this alloy can be used for tube plate, side supports and header tanks in heat exchanger units, and may have other uses, it is primarily intended as a finstock alloy for heat exchangers. The alloy can be stronger, so the finstock can be thinner and lighter and have better thermal conductivity than conventional finstock alloys.

The heat exchanger market, particularly in the automobile industry, requires that finstock alloys offer a balance of properties, i.e. strength, formability, corrosion resistance and brazability. A key feature of the novel alloys of this invention is the relatively high Si content. This increases the post-braze strength, by more than 10% relative to conventional finstock alloys, and also improves the post-braze thermal conductivity. Also, when fins of this alloy composition are joined to tubes by brazing, the Si-rich solid solution that results makes the fin more electronegative and ensures that it acts as a sacrificial anode for the tube. Si also reduces the melting point of the alloy. An upper limit on the Si content is set by the need for the alloy to have a sufficiently high solidus to be brazable.

Mn is a strengthening component and enough should be used to allow this effect to be seen. However, if too much is used, then coarse Mn–Fe intermetallics may be used which reduce formability and mechanical properties. Preferably the (Mn+Fe) content is no more than 1.9% or even 1.8%.

Fe is generally present in secondary Al alloys. In this case, its content needs to be controlled to permit high levels of Mn to be present. Alloys containing very low levels of Fe are less attractive owing to the increased cost of exercising tight control over the Fe content.

Mg is preferably present as a strengthening component. At high concentrations an undesired MgO deposit is formed on the metal surface during brazing. The Mg concentration is controlled at levels where this is not a problem.

Cu is preferably included as a strengthening component. Cu is believed not to reduce corrosion resistance in a way that has previously been reported. Alloys containing high concentrations of copper are difficult to cast, but if these problems can be overcome then Cu concentrations up to 0.5% or even 1.0% are useful.

Zn makes the alloy more electronegative, so the Zn content should be at a level below that which results in rapid corrosion. Preferably Zn is not deliberately added.

Ti is used as a grain refiner, typically at a concentration of about 0.02%.

Other components including Sn, In and Cr are not deliberately added to the alloy, but may be present as impurities in concentrations up to 0.05% each, 0.15% total. The balance of the alloy consists of Al.

In another aspect, this invention provides a brazed heat exchanger having fins of the alloy defined. Preferably the brazed heat exchanger has tubes (and optionally also tanks, header plates, etc.), of an alloy having the composition.

| Component | Wt % |
|---|---|
| Mn | 0.7–1.5 |
| Cu | 0.1–1.0 |
| Fe | up to 0.4 |
| Si | up to 0.2 |
| Mg | up to 0.8 |
| V and/or Cr | up to 0.3 |
| Zn | up to 0.2 preferably up to 0.1 |
| Ti | up to 0.1 |
| Others | up to 0.05 each, 0.15 total |
| Al | balance |

These alloys are described in U.S. Pat. Nos. 5,037,707 and 5,041,343, and in WO 94/22633, all in the name of Alcan International Limited. The corrosion resistant properties of these alloys are enhanced by the relatively high Mn and particularly Cu contents, and by exercising strict control over the levels of Fe, Zn and particularly Si. Heat exchangers with tubes of these published alloys containing 0.5–1.0% Cu, and with fins of the above finstock alloy have excellent corrosion resistance allied to good formability, brazability and post-braze strength. With a reduced rate of corrosion attack on the fin, heat transfer performance will be maintained. The additional properties of higher post-brazed strength and increased sag resistance offer the opportunity for down gauging and reducing jigging of units prior to the brazing cycle.

Clad brazing sheet is often used to make brazed heat exchanger tubes, tanks, header plates, etc. The clad brazing sheet has a core whose composition is not material but may be as shown above; and cladding on one or both surfaces of an alloy that has a low melting point by virtue of containing a high concentration of Si. Process scrap from such clad brazing sheet can be remelted and used to make finstock or other heat exchanger components.

In yet another aspect, the invention provides a method of making heat exchanger components, by forming an Al alloy melt comprising discarded heat exchangers and/or clad brazing sheet scrap, adjusting the composition of the melt, and using the resulting melt to make heat exchanger components, characterised in that discarded heat exchangers are brazed heat exchangers as defined above.

In this practice, an aluminium alloy melt is formed using discarded heat exchangers and/or brazing sheet scrap and possibly other scrap. The composition of the melt is adjusted, by the addition of Al metal or other components as required. Then the melt is cast into ingots, which are rolled or extruded by conventional methods to provide the required heat exchanger components. Standard recycling techniques can cope quite adequately with raised Si levels, such as may result from the use of discarded brazed heat exchangers according to this invention and/or clad brazing sheet scrap.

EXAMPLE 1

A 7000 kg ingot was DC cast using conventional technique preheated to 520° C. and hot rolled to a thickness of 3.5 mm. The sheet was then cold rolled to 0.4 mm and annealed at 360° C. for 2 hours before further cold rolling to 0.110 mm. This is the H18 temper.

The ingot had the composition: 0.4% Fe; 0.9% Si; 1.3% Mn; 0.1% Mg; 0.3% Cu; balance Al of commercial purity.

The cold rolled sheet had the following mechanical and electro chemical properties after being subjected to a commercial brazing cycle (approximately 5 minutes at 605° C. and air cool).

AA3003 is a commercial alloy used for finstock and subjected to the same brazing cycle.

|  | This Invention | AA3003 |
|---|---|---|
| UTS | 162 MPa | 135 MPa |
| Proof | 59 MPa | 40 MPa |
| Ductility | 18% | 20% |
| Corrosion potential (ASTM G69) | −750 to −780 mV | −690 to −710 mV |

The corrosion potential is sufficiently negative to make the metal useful as sacrificial anodes in brazed heat exchangers. Without the addition of a substantial proportion of Zn, the AA3003 alloy would not have been useful in this sense.

Another ingot of the same invention composition was hot rolled to 3 mm, cold rolled to 0.18 mm, interannealed at 360–400° C. for 2 hours, and finally cold rolled to 0.110 mm. This is the H14 temper. The post-braze properties would have been essentially the same as those set out above.

EXAMPLE 2

The following alloys were investigated.

| Component (wt %) | X800 | X900 | 3003 | Invention |
|---|---|---|---|---|
| Fe | <0.4 | <0.4 | <0.7 | 0.4 |
| Si | <0.15 | <0.15 | <0.6 | 0.9 |
| Mn | 0.7–1.5 | 0.7–1.5 | 1.0–1.5 | 1.3 |
| Mg | <0.8 | <0.8 | — | 0.1 |
| Cu | 0.1–0.6 | 0.5–1.0 | 0.05–0.20 | 0.3 |
| Zn | — | — | <0.1 | — |
| Ti | <0.1 | <0.1 | — | — |
| V/Cr | <0.3 | <0.3 | — | — |

The thermal conductivity of AA3003 in the 0 temper is 185 W/mK. The thermal conductivity of the invention alloy is 215 W/mK.

The galvanic ranking of these alloys, as determined by ASTM G69 (1994), in a post-braze state is as follows:

X800 is −715 mV

X900 is −730 mV 3003 is −730 mV

Invention alloy is −740 mV.

The differences between X800 and X900 on the one hand and the invention alloy on the other hand are in the range 10–25 mV. These differences are sufficient to allow fins of the invention alloy to act as sacrificial anodes; but not so great as to encourage rapid sacrificial corrosion. This was illustrated by means of a ZRA galvanic compatibility experiment, in which the invention alloy was used for finstock and the X900 alloy for tubestock. The difference in corrosion potentials (ASTMG 69) was 15 mV. The following values were obtained in the ZRA experiment:

Current-8 $\mu$A

Corrosion rate-90 $\mu$m/yr.

What is claimed is:

1. A brazed heat exchanger having fins consisting of an alloy consisting essentially of

| Component | Wt % |
|---|---|
| Fe | 0.2–0.5 |
| Si | 0.7–1.2 |
| Mn | 1.2–1.6 |
| Mg | up to 0.3 |
| Cu | 0.27–0.5 |
| Zn | up to 0.2 |
| Ti | up to 0.1 |
| Others | up to 0.05 each, 0.15 total |
| Al | Balance. |

2. A brazed heat exchanger having fins consisting of an alloy consisting essentially of

| Component | Wt % |
|---|---|
| Fe | 0.3–0.5 |
| Si | 0.8–1.0 |
| Mn | 1.25–1.5 |
| Mg | 0.07–0.13 |
| Cu | 0.27–0.4 |
| Zn | up to 0.1 |
| Ti | up to 0.05 |
| Others | up to 0.05 each, 0.15 total |
| Al | Balance. |

3. A brazed heat exchanger having tubes of an alloy having the composition

| Component | Wt % |
|---|---|
| Mn | 0.7–1.5 |
| Cu | 0.1–1.0 |
| Fe | up to 0.4 |
| Si | up to 0.2 |
| Mg | up to 0.8 |
| V and/or Cr | up to 0.3 |
| Zn | up to 0.2 |
| Ti | up to 0.1 |
| Others | up to 0.05 each, 0.15 total |
| Al | balance | and having fins consisting of an alloy consisting essentially of

| Component | Broad (wt %) | Preferred |
|---|---|---|
| Fe | 0.2–0.5 | 0.3–0.5 |
| Si | 0.7–1.2 | 0.8–1.0 |
| Mn | 1.2–1.6 | 1.25–1.5 |
| Mg | up to 0.3 | 0.07–0.13 |
| Cu | up to 0.5 | 0.27–0.4 |
| Zn | up to 0.2 | up to 0.1 |
| Ti | up to 0.1 | up to 0.05 |
| Others | up to 0.05 each, 0.15 total | |
| Al | balance | | wherein the galvanic potential of the fins is more negative than the galvanic potential of the tubes.

4. The brazed heat exchanger of claim 3, wherein the galvanic potential of the fins is 10–25 mV more electronegative than the galvanic potential of the tubes.

5. The brazed heat exchanger of claim 3, wherein the fins are of an alloy consisting essentially of

| Component | Wt % |
|---|---|
| Fe | 0.3–0.5 |
| Si | 0.8–1.0 |
| Mn | 1.25–1.5 |
| Mg | 0.07–0.13 |
| Cu | 0.27–0.4 |
| Zn | up to 0.1 |
| Ti | up to 0.05 |
| Others | up to 0.05 each, 0.15 total |
| Al | balance. |

6. The brazed heat exchanger of claim 5, wherein the galvanic potential of the fins is 10–25 mV more electronegative than the galvanic potential of the tubes.

7. A method of making heat exchanger components, by forming an Al alloy melt from discarded heat exchangers and optionally also from clad brazing sheet scrap, adjusting the composition of the melt, and using the resulting melt to make heat exchanger components, characterized in that discarded heat exchangers are brazed heat exchangers according to claim 1.

8. A method of making heat exchanger components, by forming an Al alloy melt from discarded heat exchangers and optionally also from clad brazing sheet scrap, adjusting the composition of the melt, and using the resulting melt to make heat exchanger components, characterized in that discarded heat exchangers are brazed heat exchangers according to claim 3.

* * * * *